(12) United States Patent
Imanishi et al.

(10) Patent No.: US 6,371,052 B1
(45) Date of Patent: Apr. 16, 2002

(54) SEAWATER CIRCULATING SYSTEM

(75) Inventors: Ryoji Imanishi, Kushima; Hiroyoshi Hata, Fujimi, both of (JP)

(73) Assignee: Takamura Co., Ltd., Kushima (JP)

( * ) Notice: Subject to any disclaimer, the term of this patent is extended or adjusted under 35 U.S.C. 154(b) by 0 days.

(21) Appl. No.: 09/637,169

(22) Filed: Aug. 14, 2000

(51) Int. Cl.[7] ............................................. A01K 63/04
(52) U.S. Cl. ................................................. 119/232
(58) Field of Search ............................... 119/232, 233, 119/263, 267

(56) References Cited

U.S. PATENT DOCUMENTS

| | | | | |
|---|---|---|---|---|
| 3,452,966 A | * | 7/1969 | Smolski | 261/77 |
| 4,488,508 A | * | 12/1984 | Heideman | 119/215 |
| 4,927,568 A | * | 5/1990 | Campau | 261/36.1 |
| 5,628,281 A | * | 5/1997 | Kelley | 119/262 |
| 5,832,870 A | * | 11/1998 | Lin | 119/261 |
| 5,938,981 A | * | 8/1999 | Burgess | 261/34.1 |
| 6,015,216 A | * | 1/2000 | Nakamura | 362/96 |

\* cited by examiner

Primary Examiner—Charles T. Jordan
Assistant Examiner—Jordan Lofdahl
(74) Attorney, Agent, or Firm—Finnegan, Henderson, Farabow, Garrett & Dunner, L.L.P

(57) ABSTRACT

The invention has the purpose of improving and maintaining the water quality inside bays where fish are cultivated, and achieving a habitat that is amenable for fish and other marine life. The supply of seawater from the open ocean into bays is controlled more by the tides than by the currents, and while oxygen-deficient marine areas occur near the ocean floor, the oxygen content in the seawater near the surface is held comparatively high by the photosynthesis of phytoplankton and dissolution from the atmosphere. Therefore, oxygen-deficient and oxygen-less areas can be easily dissipated and eliminated by stirring the sea floor, especially the water of the bottom layer, by means of a seawater pump. The system comprises a seawater pump 100 provided underwater and an oxygen concentration sensor provided near the sea floor, the system being capable of eliminating oxygen-deficient areas by operating the seawater pump 100 and stirring the water of the bottom layer when the measured oxygen concentration goes below a predetermined value.

18 Claims, 9 Drawing Sheets

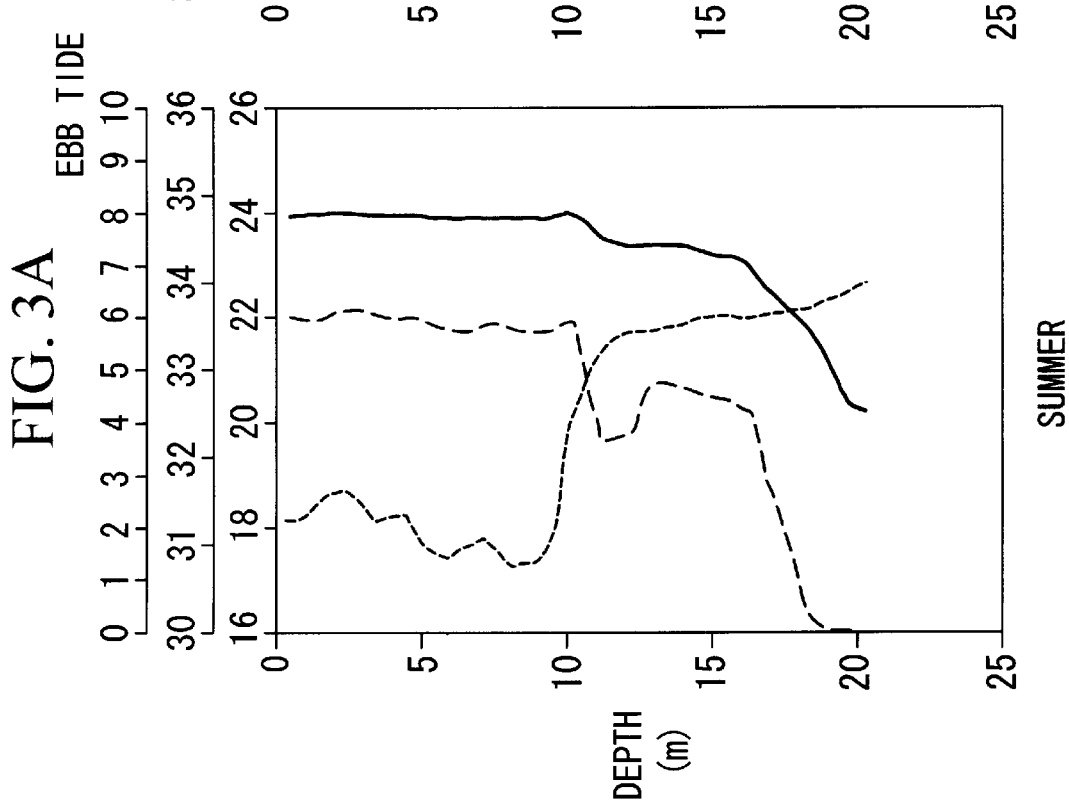

SEAWATER CIRCULATING SYSTEM

BACKGROUND OF THE INVENTION

1. Field of the Invention

The present invention relates to a seawater circulating system for improving breeding conditions in fisheries, and more particularly to a seawater circulating system for improving the breeding conditions in fisheries by driving a pump provided underwater to dissipate and eliminate oxygen-deficient water masses, thereby holding the dissolved oxygen concentration in the seawater to at least a predetermined value.

2. Description of Related Art

The confinement of marine areas is rising sharply due to the concentration of human populations in urban areas and modernization in river and harbor facilities, as a result of which the development of the surface-fed fisheries industry inside bays has led to an increased influx and accumulation of biomass to the confined marine areas, thus causing so-called artificial eutrophication. The self-cleansing ability of these marine areas has been comparatively reduced with the reconstruction and modernization of rivers, seashores and bays, so that marine areas which have a tendency to allow pollution of the water and sediment are becoming more common. A typical pollution pattern based on eutrophication of confined marine areas is one where the seawater stratifies in times of high water temperature and the bottom layer stagnates, causing large amounts of oxygen to be consumed in the decomposition of the accumulated organic material, thereby making the water of the bottom layer deficient in oxygen or devoid of oxygen and forming stagnant oxygen-deficient water masses. When this continues for a long period of time, the sea floor becomes anaerobic (i.e. becomes an oxygen-less environment), as a consequence of which the bottom mud begins to perform circulatory decomposition, generating sulfides, causing blackening and releasing the stench of hydrogen sulfide.

Confined marine areas which have reached this state can give rise to mass deaths of fish and other marine life and be a source of foul smells. Thus, they are highly likely to sustain severe blows both as natural marine environments and as fisheries.

The cycle of oxygen use in fishery installations inside bays is such that oxygen is consumed by the oxidative decomposition of wastes, feed residues and the like of the fish being bred and respiratory bacteria among the plankton, while the oxygen is replenished by the influx of fresh seawater from outside, photosynthesis of phytoplankton and dissolution from the air.

Since fresh water enters bays more often as a result of the action of the tides rather than of ocean currents, the consumption of oxygen exceeds the supply at times of high water temperature during which the oxygen dissolution rate is low, thus causing oxygen-deficient conditions. That is, oxygen-deficient or oxygen-less conditions are caused by the reduction of the oxygen supply and rise of bottom layer oxygen-deficient water masses.

On the other hand, while fisheries can be largely divided into open-sea and in-bay types, most fisheries operate within the confined marine areas of bays. However, since the circulation of seawater in these types of marine areas more often depends on the tides than on ocean currents, oxygen-deficient conditions can often arise in these fisheries in the summer and into autumn, depending on the location, thus forming oxygen-deficient water masses. There are reports that the amount of dissolved oxygen inside bays is generally lower than on the open ocean. Oxygen-deficient water masses can be a direct cause of suffocation leading to death in fish, which can lead to disastrous consequences. Additionally, whereas the risks involved in aquaculture in confined areas include oxygen-deficient water masses, proliferation of parasites and infection by pathogens, the proliferation of parasites and contamination by pathogens can be avoided to a certain extent if sufficient oxygen is provided by preventing the formation of oxygen-deficient water masses, thereby reducing the risks to fisheries.

BRIEF SUMMARY OF THE INVENTION

In view of the above circumstances, the present invention has the purpose of improving and maintaining the water quality inside bays where fish are cultivated, and achieving a habitat that is amenable for fish and other marine life. The inventors of the present invention have noted the fact that the supply of seawater from the open ocean into bays is controlled more by the tides than by the currents, and the fact that while oxygen-deficient marine areas occur near the ocean floor, the oxygen content in the seawater near the surface is held comparatively high by the photosynthesis of phytoplankton and dissolution from the atmosphere, thus coming to the conclusion that oxygen-deficient and oxygen-less areas can be easily dissipated and eliminated by stirring the sea floor, especially the water of the bottom layer, by means of a seawater pump.

Thus, in a first aspect of the present invention, the inventors propose a system comprising a seawater pump provided underwater and an oxygen concentration sensor provided near the sea floor, the system being capable of eliminating oxygen-deficient areas by operating the seawater pump and stirring the water of the bottom layer when the measured oxygen concentration goes below a predetermined value.

Additionally, the inventors have noted that the natural agitation of water inside bays is controlled more by the tides than by the currents, and have thereby discovered that it is effective to stir the seawater in a vertical direction when supplementing natural agitation using a seawater pump.

Thus, in a second aspect of the present invention, the inventors propose a system comprising a seawater pump provided underwater and an oxygen concentration sensor provided near the sea floor, the system being capable of eliminating oxygen-deficient areas by operating the seawater pump and stirring the water of the bottom layer while simultaneously introducing seawater with a high dissolved oxygen concentration from the surface layer to the bottom layer when the measured oxygen concentration goes below a predetermined value.

Furthermore, the inventors observed that the conditions under which oxygen-deficient marine areas occur, being decided by such factors as the tides, currents, temperature changes and sunlight, fluctuate in a roughly one-year cycle, thus discovering that it is possible to predict to when and in which areas oxygen-deficient conditions will occur.

According to a third aspect of the present invention, the inventors propose a method for operating a system comprising a seawater pump provided underwater, the system operating method being such that the occurrence of oxygen-deficient areas is prevented by operating the seawater pump beforehand at times when the occurrence of oxygen-deficient areas are predicted based on annual oxygen-deficient area occurrence data.

Finally, the inventors have noted that one of the reasons for the comparatively high dissolved oxygen concentration near the ocean surface is the photosynthesis of phytoplankton near the surface, thus discovering that it is possible to induce photosynthesis in phytoplankton in the water of the bottom layer by introducing sunlight thereto.

Thus, according to a fourth aspect of the present invention, the inventors propose a sunlight collecting apparatus comprising a light receiving portion capable of being provided on the water surface, a light scattering portion capable of being provided near the sea floor and a light conducting portion for conducting light from the light receiving portion to the light scattering portion.

Other features and structures of the present invention aside from those mentioned above should be made clear from the description of the embodiments with reference to the attached drawings.

BRIEF DESCRIPTION OF THE DRAWINGS

FIGS. 3A and 3B are diagrams showing a vertical distribution of water temperature, saline content and dissolved oxygen concentration in confined marine areas.

DETAILED DESCRIPTION OF THE INVENTION

Figure 1:
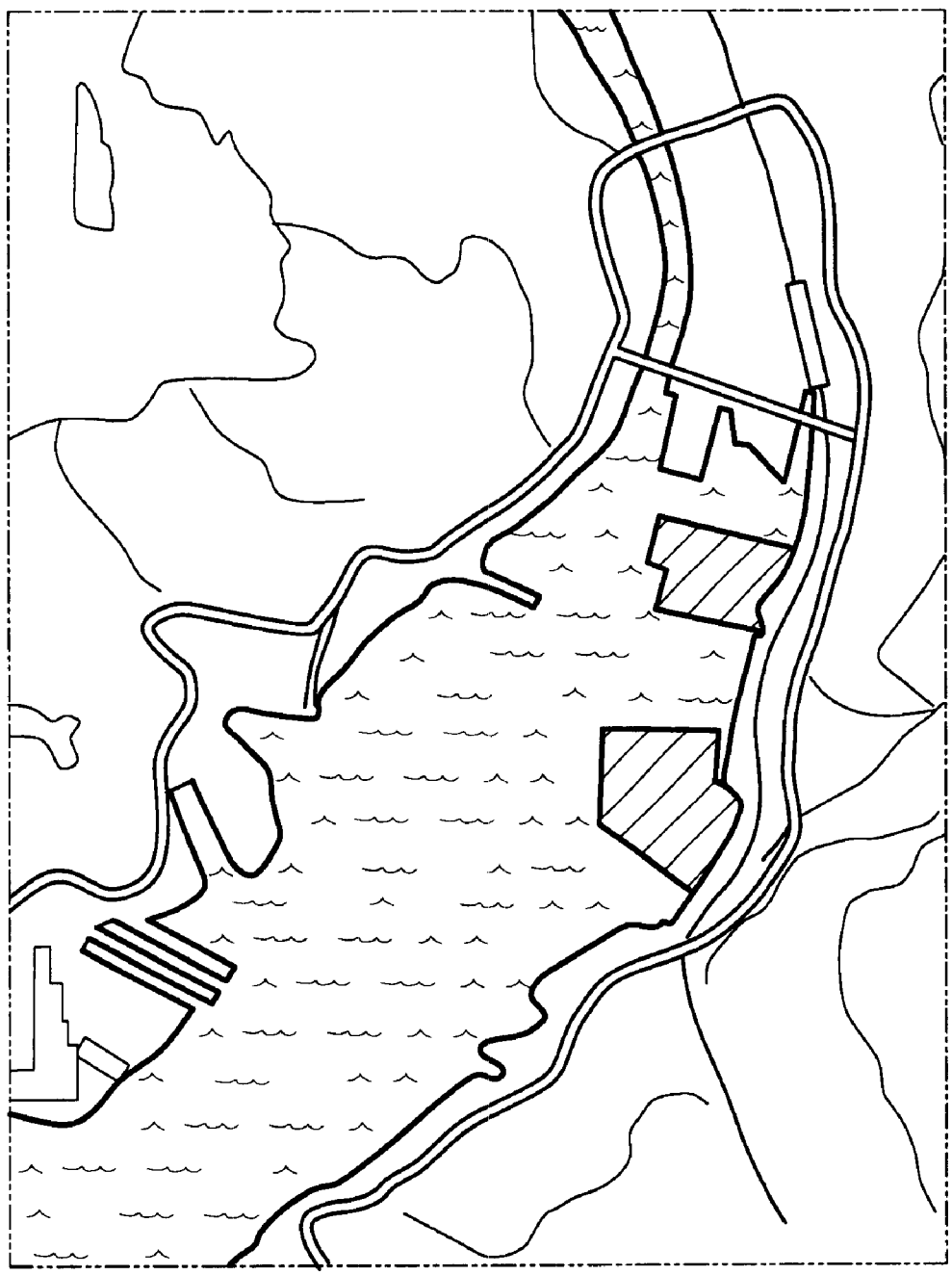
FIG. 1 is a drawing showing an example of a confined marine area in which fish and other aquatic life are cultivated.

FIG. 1 shows an enclosed marine area taking as an example Nagasaki Harbor. A confined marine area has the geographical features of the mouth which is open to the open ocean being small and the in-bay marine area being comparatively large. The waves on the surface are small in comparison to the open ocean, and locations with favorable water depths can be selected according to the purpose, thus allowing for wide use as breeding areas for fish and other marine life. On the other hand, as evidenced by measurement results which show the dissolved oxygen concentration in confined marine areas to be low as compared with the open ocean, a major problem in using confined marine areas for the breeding of fish and other marine life is the sometime decrease in dissolved oxygen concentration in specific areas, which can have a detrimental influence on the fish and other marine life.

FIG. 1 shows an embodiment of a seawater circulating system according to the present invention. In the case of the embodiment shown, a seawater pump 100 is installed near the sea floor inside a bay, and power is supplied from a solar cell and battery apparatus 110 provided on the sea surface to the seawater pump 100 via a cable 120. A control signal receiving device is provided along with the solar cell and battery apparatus 110, for receiving control signal from a land-based transmitting device (not shown) for driving the seawater pump. Alternatively, a computer and memory device can be provided on the solar cell and battery apparatus 110 instead of the receiving device for controlling the operation of the seawater pump 100 according to a preset program. In this case, the program may be such as to input measurements of oxygen concentration in the seawater and to activate the pump when the oxygen concentration becomes less than a predetermined value, or to operate the pump in accordance with a pre-arranged yearly pump operating schedule. The power may also be supplied by a power cable connected from land.

FIGS. 3A and 3B show the vertical distribution of water temperature, salinity and dissolved oxygen concentration in confined marine areas. The graph shows that there is a large change in the values for water temperature, salinity and dissolved oxygen concentration at a depth of around 10 m. With regard to the dissolved oxygen concentration, although it is roughly constant at about 6 mg/l from the surface to about 10 m below, it drops drastically upon exceeding 10 m and falls to almost nil at a depth of 20 m. Additionally, when comparing the measurement distributions at high and low tides, the depth at which a sudden change in the measured values for dissolved oxygen concentration and the like is observed becomes shallower at low tide and deeper at high tide, so that although the thickness of the surface layer in which the dissolved oxygen concentration is high and roughly constant changes, the bottom layer underneath is not affected by the tides and always has a low dissolved oxygen concentration. Additionally, the distribution of the dissolved oxygen concentration changes under the influence of many factors including sunlight, temperature, tides, currents and rainfall. In particular, cultivated fish and the like are adversely affected when the oxygen-deficient and oxygen-less areas in which the dissolved oxygen concentration expands or moves to encroach upon the breeding areas of the fish and the like.

Figure 2:
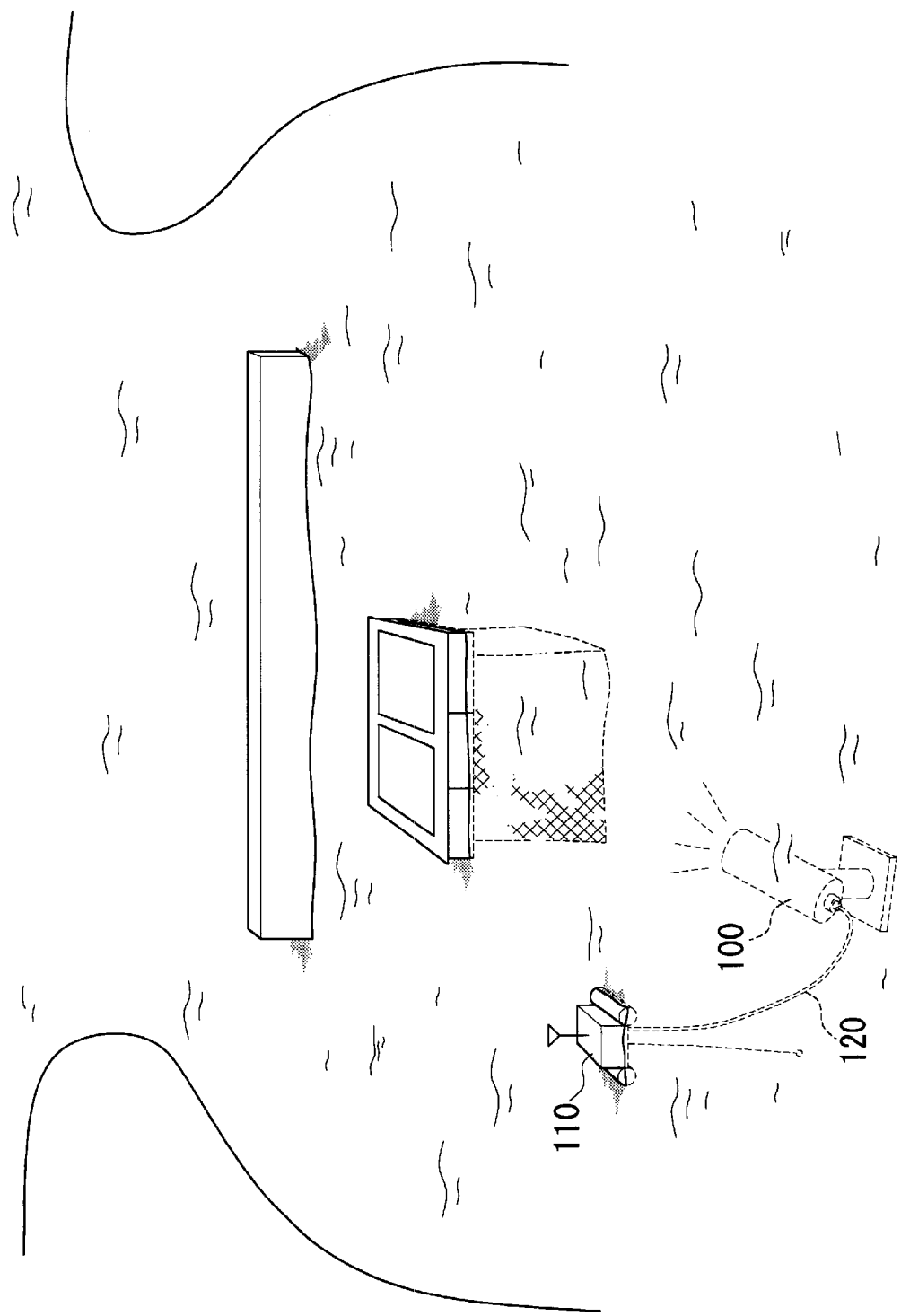
FIG. 2 is a schematic view showing the stirring of seawater in a confined marine area wherein fish and other aquatic life are cultivated using a seawater pump.

Therefore, in order to eliminate stagnation of the bottom layer in confined marine areas, it may be effective to cause a large flow of the bottom layer in stagnant areas to dissipate stagnant water and promote circulation. To this end, FIG. 2 shows schematically a system according to the present invention wherein a seawater pump 100 is installed near the sea floor to eliminate stagnant water by sucking up and expelling the seawater of the bottom layer. As shown in FIG. 2, a seawater pump 100 is provided near the sea floor in the vicinity of a fish breeding area and factors which indicate the water quality such as the dissolved oxygen concentration, chemical oxygen demand (COD) and water temperature are measured. When the water quality degrades to an environment which is not suitable for the bree.ding of fish, the seawater pump 100 is activated so as to improve the water quality by agitating the water, particularly in the bottom layer.

Figure 4A:
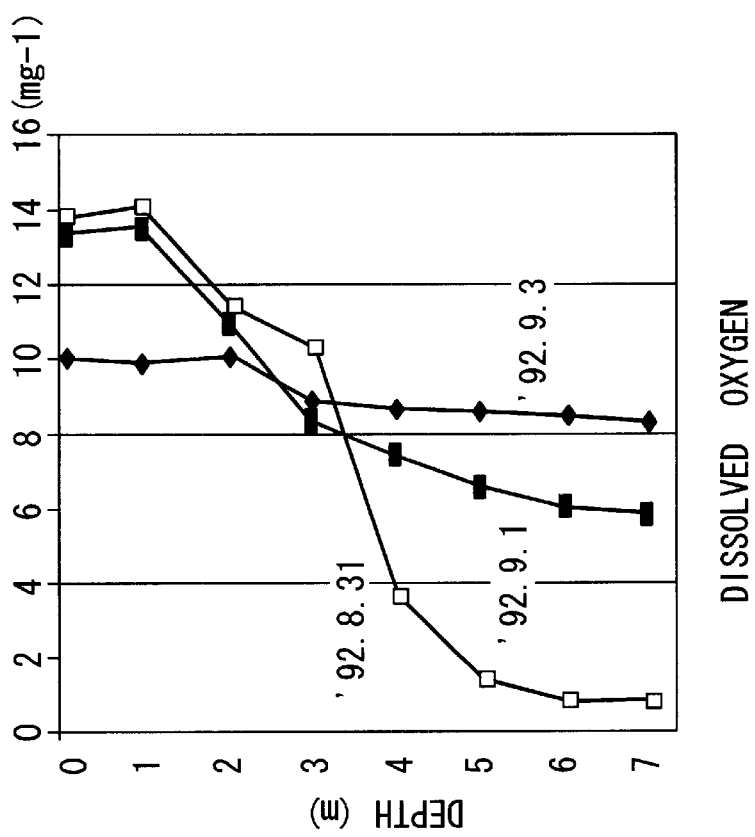
FIGS. 4A and 4B are diagrams showing changes in the water temperature and dissolved oxygen concentration due to operation of a seawater pump.
Figure 4B:
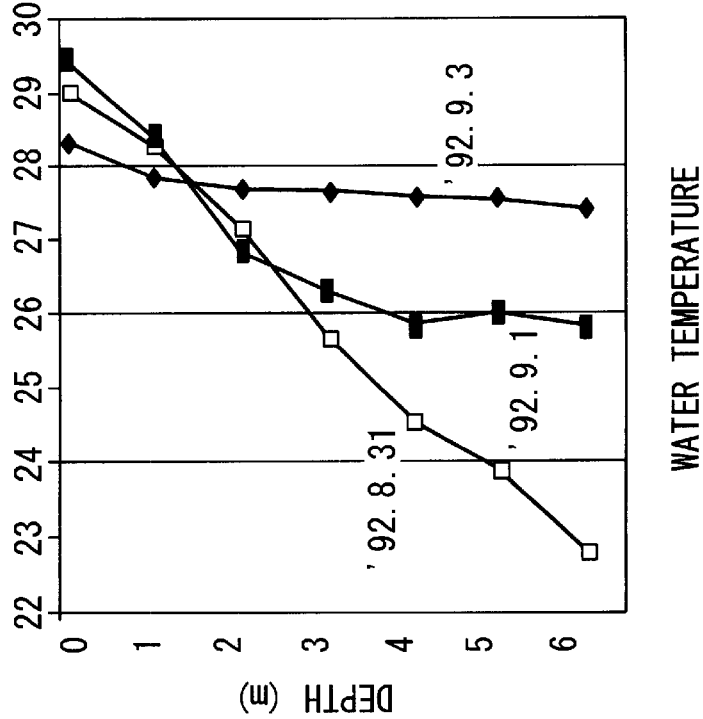

FIGS. 4A and 4B show the changes in water temperature and dissolved oxygen concentration in the sea due to the operation of the seawater pump 100. With regard to the water temperature, whereas the water temperature drops linearly with the depth from the sea surface prior to installation of a seawater pump 100, the water temperature is roughly constant to a depth of 6 m three days after activation of the seawater pump 100. With regard to the dissolved oxygen content, there is a sharp decrease starting at 3 m and goes to an extremely severe environment of almost zero at a depth of 6 m prior to operation of the seawater pump 100, whereas after three days of operation of the pump 100, notwithstanding a slight drop near the surface down to 1–2 m from the surface, the value is roughly constant down to a depth of 7 m. Particularly noteworthy is the fact that the dissolved oxygen content is not stirred uniform by the pump 100, but that there is an overall increase in the dissolved oxygen content. This is believed to be related particularly to increased activity in photosynthesis of phytoplankton near the sea surface.

While the seawater pump 100 is in principle designed to be activated when a drop in water quality is observed, it can be made to depend not only on measurements indicating water quality but also to consider the currents and tides at the same time. That is, the energy of the pump 100 can be put to effective use by directing the flow from the pump 100 in a direction which supplements the natural flow of seawater due to the tides.

As a result, it is possible to eliminate oxygen-deficient or oxygen-less areas in the bottom layer, thus eliminating hostile environments in which cultivated fish and the like can die while simultaneously improving the bottom quality by oxidation of the metal sulfide layer on the sea floor (transfer from black mud to a brown oxide layer), reducing the proportion of area occupied by shizuku-gai (a species of shellfish found in Japan, the population of which serves as an indicator of organic contamination) and increase in the number and types of bottom-dwelling microbes, the regeneration of seaweeds, fish and other marine life, prevention of red tides and reduction of pearl oyster mortality rates.

Figure 5:
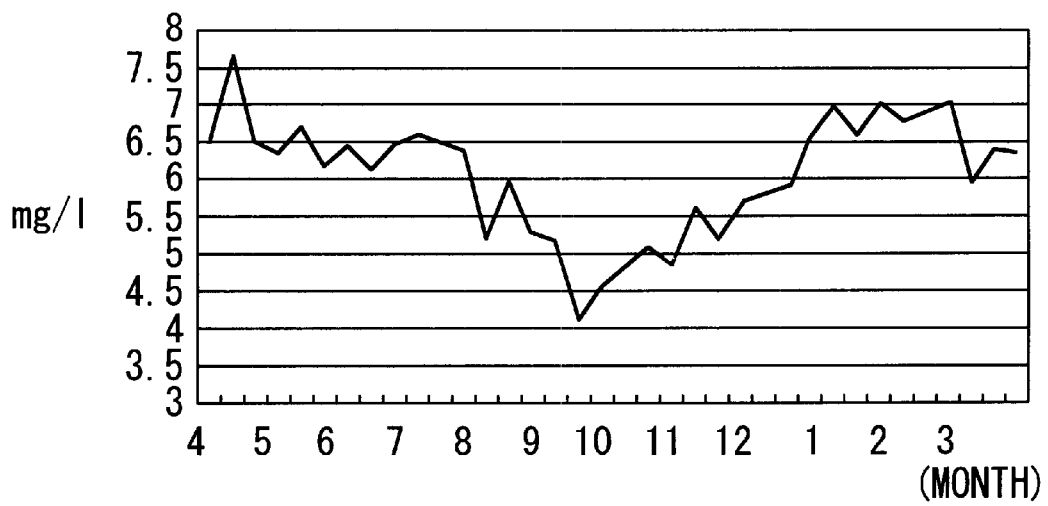
FIG. 5 is a diagram showing the change in dissolved oxygen concentration in confined marine areas over the year.

Table 1 is a table showing the yearly change in dissolved oxygen content in confined marine areas, and FIG. 5 is a graph showing the results of the measurement. The portions which are filled in by gray are periods in which the dissolved oxygen concentration falls to dangerous levels for fish or other marine life. As mentioned above, the dissolved oxygen concentration is influenced by many factors such as sunlight, tides and currents, but it can be seen that there are similar tendencies which form a cyclic pattern over the course of a year. That is, as is clear from Table 1 and FIG. 5, in the confined marine area in which measurements were taken, oxygen-deficient water masses tend to occur in the summer, among which extremely stringent conditions tend to arise in September.

Accordingly, it is possible to prevent the occurrence of low-oxygen or oxygen-deficient water masses by measuring the yearly cycle beforehand and presetting a yearly operation program for the seawater pump 100. Of course, this program may be such as to make simultaneous water quality measurements and to change the operation under the program based on the water quality measurements, or conversely to change the operation of a seawater pump 100 based on water quality measurements using a yearly program.

TABLE 1

DO Change in Fishery: April 1996 to March 1997

|  | Apr | May | Jun | Jul | Aug | Sep | Oct | Nov | Dec | Jan | Feb | Mar |
|---|---|---|---|---|---|---|---|---|---|---|---|---|
| 1st | — | 5.8 | 6.3 | 6.1 | 5.1 | — | — | 5.8 | — | — | 7.2 | 6.4 |
| 2nd | — | 6.7 | 7.2 | 5.7 | — | — | 4.5 | 4.7 | 6.6 | — | — | — |
| 3rd | — | — | 7.9 | 6.0 | 4.1 | 5.1 | 4.6 | — | 6.2 | 7.1 | 6.8 | 6.0 |
| 4th | — | 5.4 | 6.7 | 6.2 | — | 5.6 | 4.7 | 6.0 | 5.5 | — | 6.4 | 6.2 |
| 5th | — | — | 6.7 | 7.5 | — | 5.1 | 4.8 | 5.6 | — | — | 6.4 | 5.2 |
| 6th | — | 6.5 | 6.2 | 6.4 | 4.6 | 4.4 | — | — | 5.6 | 7.6 | 6.5 | 6.0 |
| 7th | — | 6.3 | 5.8 | 6.6 | 5.1 | — | 4.9 | — | 4.6 | 7.3 | 7.3 | 6.2 |
| 8th | — | 7.3 | 5.8 | — | 5.4 | — | 4.9 | 4.9 | — | 6.7 | 6.3 | 7.2 |
| 9th | 6.8 | 6.6 | — | 6.1 | 4.3 | — | 4.3 | 5.5 | 6.9 | 6.8 | — | — |
| 10th | 6.2 | 6.2 | 5.8 | 6.6 | — | 5.2 | — | 6.6 | 6.8 | 7.2 | 7.3 | 5.6 |
| 11th | 7.9 | 6.5 | 5.8 | 7.5 | 7.1 | 5.8 | 5.2 | — | 5.8 | 6.3 | — | 5.4 |
| 12th | 7.4 | 6.9 | 6.0 | 6.4 | 6.3 | 5.0 | 5.5 | 5.0 | 5.2 | — | 6.6 | 5.8 |
| 13th | 8.0 | 6.5 | 5.7 | 7.1 | 4.7 | 5.0 | 5.4 | 4.6 | 6.0 | 7.5 | 6.8 | 5.4 |
| 14th | — | 7.4 | 6.3 | — | — | — | 5.3 | 5.5 | 5.1 | 5.7 | 6.4 | 7.7 |
| 15th | 8.8 | 7.1 | 6.4 | 7.1 | 6.9 | — | 5.3 | 4.4 | — | — | 6.7 | 6.9 |
| 16th | 8.0 | 6.4 | 5.7 | — | 6.2 | — | 5.0 | 4.7 | 6.5 | 6.4 | — | — |
| 17th | 7.8 | 7.2 | 6.2 | — | — | 4.0 | 4.5 | — | 5.9 | 6.7 | — | 4.7 |
| 18th | 7.4 | 6.8 | — | — | 5.6 | 4.3 | 5.5 | — | 4.7 | 6.6 | 7.2 | 6.2 |
| 19th | 7.1 | 6.2 | 6.6 | — | 6.2 | 4.3 | — | 5.3 | 5.2 | — | 7.2 | 6.5 |
| 20th | 6.7 | 6.0 | — | 5.9 | 6.1 | 4.3 | — | 6.3 | 6.9 | 6.2 | 7.2 | — |
| 21st | 7.3 | 6.1 | 6.5 | — | 6.2 | 4.3 | — | — | 6.8 | — | 7.9 | 7.0 |
| 22nd | 7.0 | 6.5 | 5.7 | 6.0 | 5.7 | — | 5.2 | 5.7 | — | 6.8 | 7.8 | 6.9 |
| 23rd | 6.6 | 6.5 | — | — | 6.0 | 4.4 | 4.9 | 4.9 | 6.7 | 7.5 | — | — |
| 24th | 6.3 | 7.2 | 7.7 | 6.8 | 5.7 | — | 4.6 | — | 7.6 | 6.7 | 7.8 | 6.5 |
| 25th | 6.1 | 6.4 | 7.1 | 6.9 | — | 4.4 | 4.7 | 6.3 | 7.0 | 6.7 | 6.8 | 5.6 |
| 26th | — | — | 6.3 | 6.5 | 5.4 | 4.4 | 4.8 | 6.0 | 6.7 | — | 6.8 | 6.2 |
| 27th | 7.9 | — | 6.0 | 6.4 | 4.4 | 5.5 | — | 5.8 | 6.0 | 7.0 | 6.5 | 6.1 |
| 28th | — | — | 6.0 | 7.0 | 4.3 | 4.3 | 5.8 | 5.3 | 6.0 | 6.8 | 5.7 | 7.1 |
| 29th | 5.6 | 5.4 | 6.4 | — | 5.4 | — | 4.6 | 5.2 | 6.1 | — | — | 6.0 |
| 30th | 5.2 | 4.5 | — | 5.0 | 5.5 | — | 5.0 | 6.4 | 7.0 | 7.1 | — | — |
| 31st | — | 6.4 | — | 6.0 | — | — | 4.7 | — | — | 7.6 | — | 7.1 |
| Avg DO | 7.1 | 6.4 | 6.3 | 6.4 | 5.5 | 4.6 | 4.9 | 5.5 | 6.1 | 6.8 | 6.9 | 6.2 |
| Max | 8.8 | 7.4 | 7.9 | 7.5 | 7.1 | 5.8 | 5.8 | 6.6 | 7.6 | 7.6 | 7.9 | 7.7 |
| Min | 5.2 | 4.5 | 5.7 | 5.0 | 4.1 | 3.6 | 4.3 | 4.4 | 4.6 | 5.7 | 5.7 | 4.7 |

Figure 6:
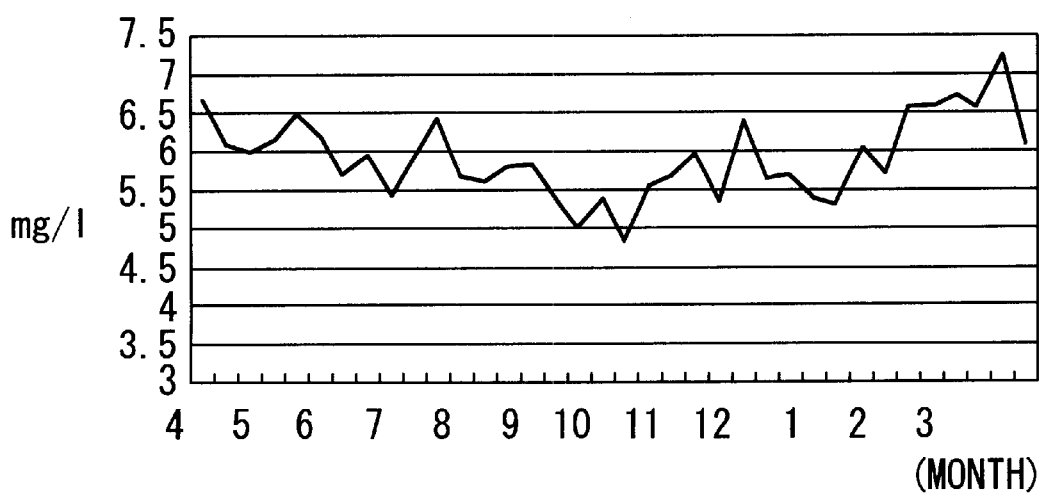
FIG. 6 is a diagram showing the effect of the operation of a seawater pump on the yearly change in dissolved oxygen concentration.

FIG. 6 is a diagram showing the change in the dissolved oxygen content over the course of the year in a confined marine area as described above in the case where a seawater pump 100 is operated based on a yearly program. As is clear from the diagram, the incidence of low dissolved oxygen rates during the summer is controlled when the seawater pump 100 is operated. In FIG. 5 where a seawater pump 100 was not activated, a period in which the dissolved oxygen concentration was less than 5.5 mg/l lasted from August to December, in contrast to which the example shown in FIG. 6 wherein the seawater pump 100 was operated has only a short period in November where it was less than 5.5 mg/l. Thus, it is clear that the breeding environment is largely improved by a yearly program of operation of the seawater pump 100.

Figure 7:
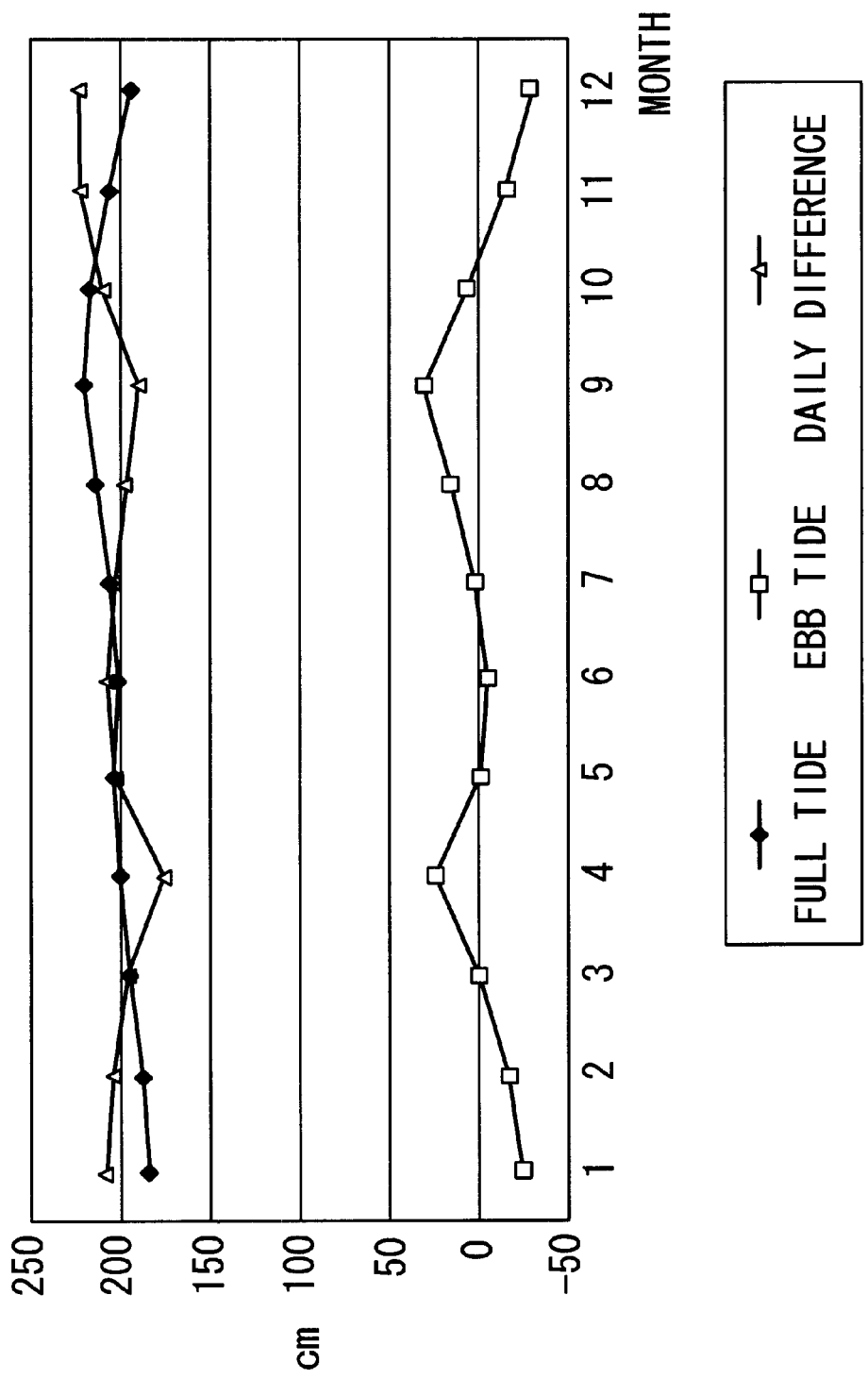
FIG. 7 is a diagram showing the yearly change in the tide level difference between high and low tides.

On the other hand, FIG. 7 is a diagram showing the yearly change in high and low tide level differences. As mentioned above, the dissolved oxygen concentration is influenced by a large number of factors, but the correlation with the tide level difference shown in FIG. 7 is very high. That is, as shown in FIG. 7, there is a considerable tendency toward a drop in dissolved oxygen concentration during the summer when the high and low tide level difference is small. This suggests that much of the natural agitation effect in confined marine areas is due to tidal forces. From this tendency, it can be predicted that the periods during which the dissolved oxygen concentration will be low will differ according to the confined marine area, the periods in which the dissolved oxygen concentration, that is, the periods during which the seawater pump 100 should be operated can be determined by measurement of tidal changes.

In FIG. 3 given above, it is shown that the dissolved oxygen concentration near the surface is kept to a more or less sufficient level even when oxygen-deficient areas occur in the bottom layer. This knowledge suggests that an effective way to operate the seawater pump 100 would be to operate it in such a way that as a consequence, the seawater near the surface and the seawater of the bottom layer are stirred or interchanged. In this case, as compared to the case where the seawater pump 100 is operated for the purpose of stirring or interchanging the seawater inside a confined marine area and the seawater of the open ocean, design considerations of the seawater pump 100 such as the location of installation, orientation of the installation and selection of operation times (such as whether to synchronize it with the tides or with the currents) will be fundamentally different. Additionally, the agitation of seawater in the confined area in a vertical direction can be accomplished with much less energy than when interchanging with seawater of the open ocean.

Additionally, by recognizing that a major factor in holding the dissolved oxygen concentration near the surface to be more or less adequate is the photosynthesis of phytoplankton near the surface where they can receive stronger sunlight, it is possible to further improve the oxygen concentration of oxygen-deficient areas by directly conducting sunlight thereto.

Figure 8:
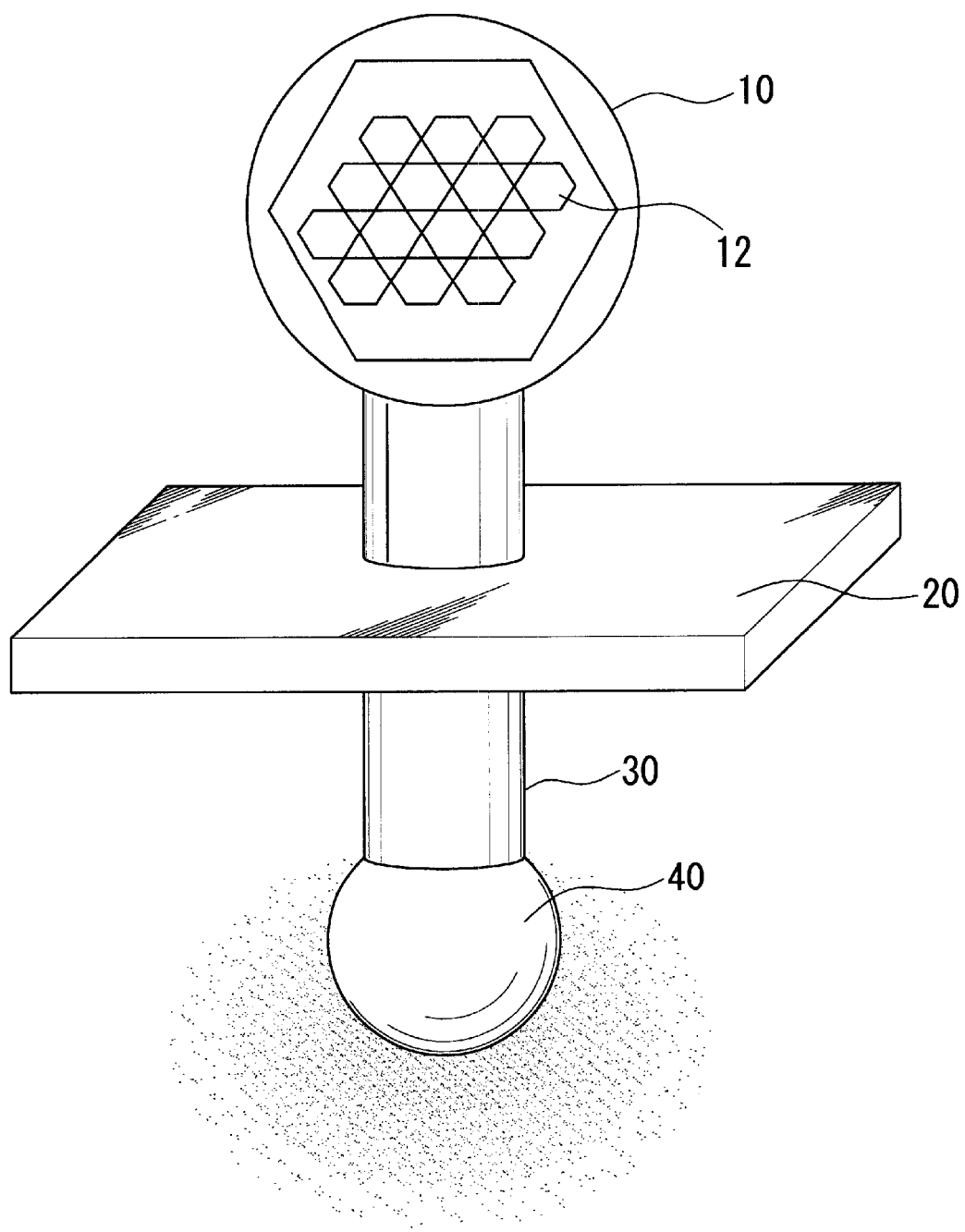
FIG. 8 is a diagram showing a first embodiment of a sunlight collecting apparatus capable of introducing sunlight underwater.

FIG. 8 shows a first embodiment of a sunlight collecting apparatus capable of conducting sunlight underwater offered by the present invention in view of the above. The sunlight collecting apparatus shown in the drawing comprises a light collecting portion 10, a float member 20 provided near the light collecting portion 10, a light conducting portion 30 and a light scattering portion 40. The float member 20 is, for example, a board-shaped member composed of a material with a low specific gravity such as polystyrene foam, which gives the sunlight collecting apparatus buoyancy so that the light collecting portion 10 will protrude from the surface into the air, and the light scattering portion will be positioned at a desired undersea location. Therefore, this sunlight collecting apparatus is free-floating. An optical fiber or other such means can be used as the light conducting portion 30.

When the light collecting portion 10 of the sunlight collecting apparatus receives sunlight, the sunlight is conducted through the light conducting portion 30 to the light scattering portion, and illuminates the sea surrounding the light scattering portion 40. The phytoplankton around the light scattering portion 40 will receive the sunlight and will be able to perform photosynthesis, thereby improving the dissolved oxygen concentration in the seawater near the light scattering portion 40. Thus, the occurrence of oxygen-deficient areas can be relieved by adjusting the length of the light conducting portion 30 so that the light scattering portion 40 reaches the water of the bottom layer. Additionally, since the sunlight collecting device induces photosynthesis in the phytoplankton, an even greater effect can be expected when used in combination with the above-described seawater pump 100. This is because the seawater is particularly agitated in a vertical direction by the operation of the seawater pump 100, so that phytoplankton which is normally abundant near the surface is moved to the bottom layer. Furthermore, the UV radiation in the sunlight works to suppress the proliferation of parasites and pathogenic microbes, thus having a germicidal effect and reducing the risks involved in aquaculture.

Figure 9:
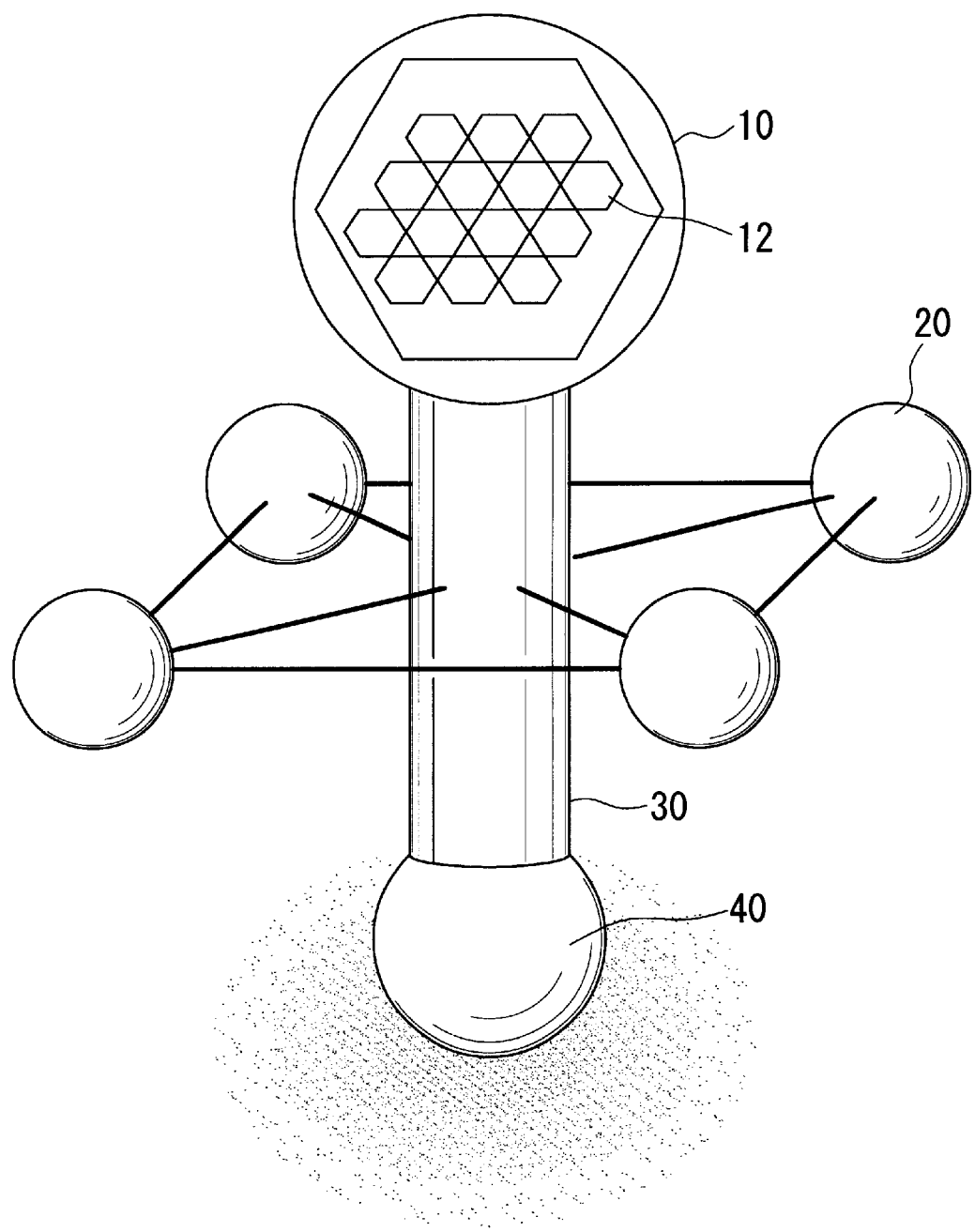
FIG. 9 is a diagram showing a second embodiment of a sunlight collecting apparatus capable of introducing sunlight underwater.

FIG. 9 is a diagram showing a second embodiment of the sunlight collecting apparatus. While the basic structure of this embodiment is similar to that of the first embodiment shown in FIG. 8, the float member 25 in this second embodiment is not a board-shaped float but has a structure wherein spherical floats are conjoined by a plurality of pipes. The material used for the spherical floats can be polystyrene foam as described in the previous embodiment, but floats composed of glass spheres may alternatively be used While the sunlight collecting systems of each of these embodiments have float members and are free-floating, it should be evident that they are still capable of bringing about the same effects even with a structure not having float members such as by affixing them to other structures installed in the sea.

Figure 10:
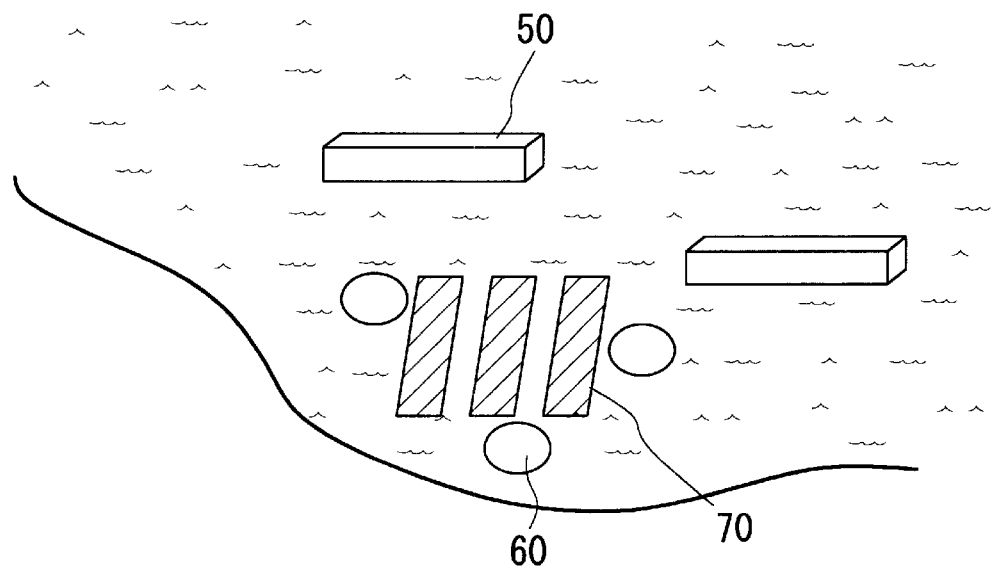
FIG. 10 is a schematic view showing the state of installation of a sunlight collecting apparatus according to the present invention in a confined marine area for cultivating fish and other aquatic life.
Figure 11:
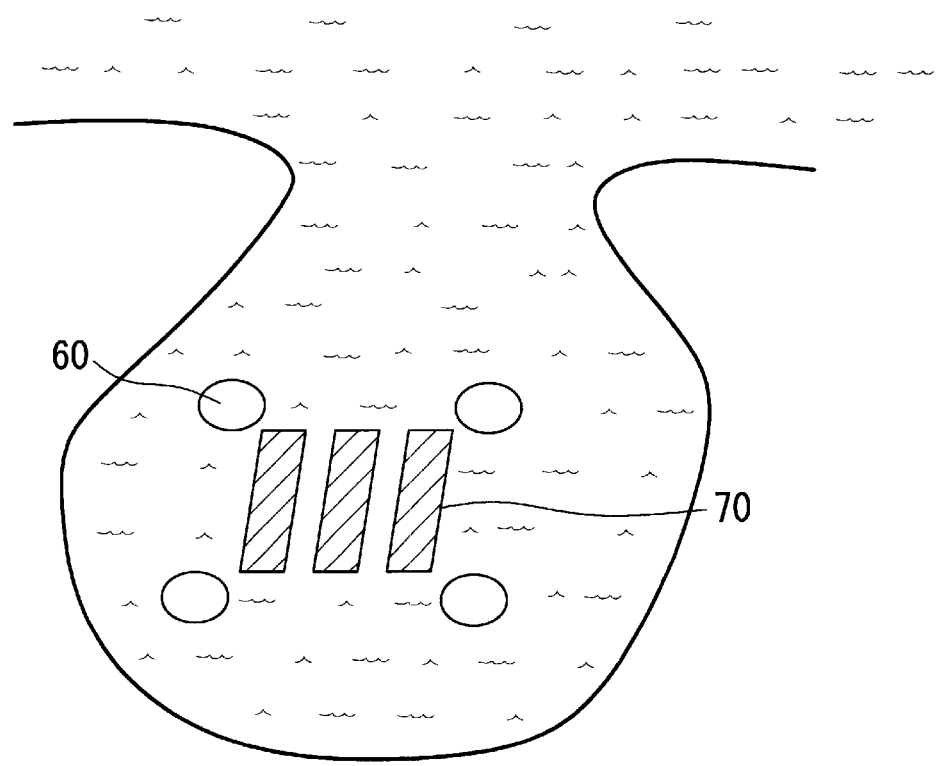
FIG. 11 is a schematic view showing another state of installation of a sunlight collecting apparatus according to the present invention in a confined marine area for cultivating fish and other aquatic life.

When considering the location of installation of the sunlight collecting apparatus, they can be provided at locations of occurrence of oxygen-deficient water masses or locations where they can be predicted to occur, but by taking into account that the purpose is to improve aquaculture conditions, it would also be effective to provide them in the vicinity of fish farms without regard to the specific locations of oxygen-deficient water masses. FIGS. 10 and 11 are diagrams which show schematic examples of installation of sunlight collecting apparatus.

What is claimed is:

1. A seawater circulating system comprising a seawater pump installed underwater and an oxygen concentration sensor installed underwater, wherein the seawater pump is operated to stir water of the bottom layer and water near the surface at designated periods to dissipate oxygen-deficient areas occurring in the bottom layer.

2. A seawater circulating system in accordance with claim 1, wherein said designated periods are when the measured oxygen concentration falls below a predetermined value.

3. A seawater circulating system in accordance with claim 1, wherein said designated periods are periods in which the occurrence of oxygen-deficient areas is predicted by yearly observation data, whereby said seawater pump is operated to prevent the occurrence of oxygen-deficient areas.

4. A seawater circulating system in accordance with claim 1, wherein seawater having a high dissolved oxygen concentration from near the surface is introduced to the bottom layer in addition to stirring the water of the bottom layer by operating the seawater pump to dissipate oxygen-deficient areas.

5. A seawater circulating system in accordance with claim 1, wherein said seawater pump is provided inside a bay, for stirring the seawater inside the bay.

6. A seawater circulating system in accordance with claim 1, further comprising a solar cell device and receiving device connected to the seawater pump, and a land-based transmitting device, wherein control signals from said transmitting device are received by said receiving device and said seawater pump is driven by power supplied from said solar cell device.

7. A seawater circulating system in accordance with claim 1, comprising a sunlight collecting and scattering apparatus having a light receiving portion installed at the sea surface, a light scattering portion installed near the sea floor and a light conducting portion for conducting light from the light receiving portion to the light scattering portion, wherein sunlight is directed underwater by said sunlight collecting and scattering apparatus to stimulate photosynthesis in phytoplankton near the sea floor.

8. An aquaculture method for improving the breeding environment of marine life by operating a seawater pump at designated periods to stir water at a bottom layer and water near the surface for dissipating oxygen-deficient areas occurring in the bottom layer, using a system comprising a seawater pump installed underwater and an oxygen concentration sensor installed underwater.

9. An aquaculture method in accordance with claim 8, wherein said designated periods are when the measured oxygen concentration falls below a designated value.

10. An aquaculture method in accordance with claim 8, wherein said designated periods are periods in which the occurrence of oxygen-deficient areas is predicted by yearly observation data, whereby said seawater pump is operated to prevent the occurrence of oxygen-deficient areas.

11. An aquaculture method in accordance with claim 8, wherein said designated periods are periods that are synchronized with tidal action in the area of installation of the seawater pump.

12. An aquaculture method in accordance with claim 8, wherein seawater having a high dissolved oxygen concentration from near the surface is introduced to the bottom layer in addition to stirring the water of the bottom layer by operating the seawater pump to dissipate oxygen-deficient areas.

13. An aquaculture method in accordance with claim 8, wherein said seawater pump is provided inside a bay, for stirring the seawater inside the bay.

14. An aquaculture method in accordance with claim 8, further comprising a solar cell device and receiving device connected to the seawater pump, and a land-based transmitting device, wherein control signals from said transmitting device are received by said receiving device and said seawater pump is driven by power supplied from said solar cell device.

15. An aquaculture method in accordance with claim 8, comprising a sunlight collecting and scattering apparatus having a light receiving portion installed at the sea surface, a light scattering portion installed near the sea floor and a light conducting portion for conducting light from the light receiving portion to the light scattering portion, wherein sunlight is directed underwater by said sunlight collecting and scattering apparatus to stimulate photosynthesis in phytoplankton near the sea floor.

16. A sunlight collecting and scattering apparatus comprising a light receiving portion capable of being installed underwater, a light scattering portion capable of being installed near the sea floor and a light conducting portion for conducting light from said light receiving portion to said light scattering portion.

17. A sunlight collecting and scattering apparatus in accordance with claim 16, wherein said light conducting portion comprises an optical fiber.

18. A sunlight collecting and scattering apparatus in accordance with claim 16, comprising a buoyancy generating portion attached to said light receiving portion capable of being set freely afloat with said light receiving portion exposed from the sea surface and said light scattering portion hanging underwater.

* * * * *

UNITED STATES PATENT AND TRADEMARK OFFICE
CERTIFICATE OF CORRECTION

PATENT NO.    : 6,371,052 B1
DATED         : April 16, 2002
INVENTOR(S)   : Ryoji Imanishi et al.

It is certified that error appears in the above-identified patent and that said Letters Patent is hereby corrected as shown below:

<u>Title page,</u>
Item [73], Assignee, "Takamura" should read -- Takamaru --.

Signed and Sealed this

Twenty-fourth Day of September, 2002

Attest:

Attesting Officer

JAMES E. ROGAN
*Director of the United States Patent and Trademark Office*